H. PECKHAM.
Straw Cutter.
No. 13,137.
Patented June 26, 1855.
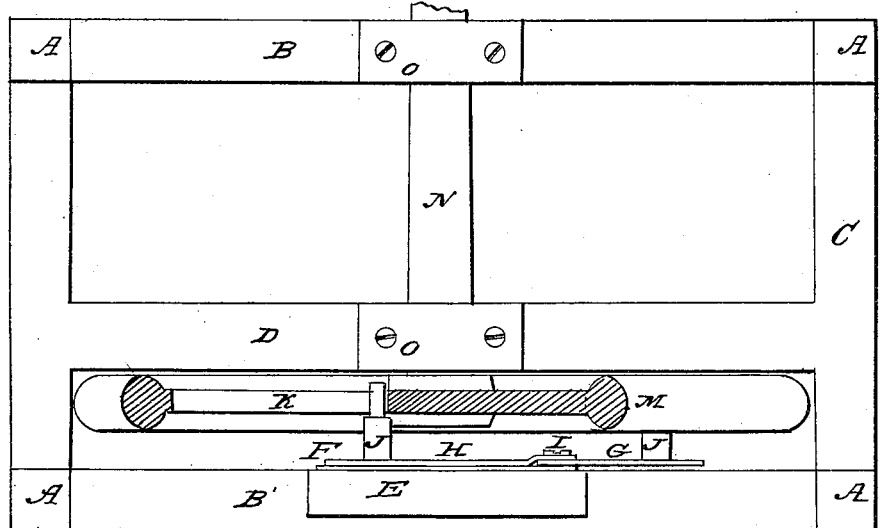
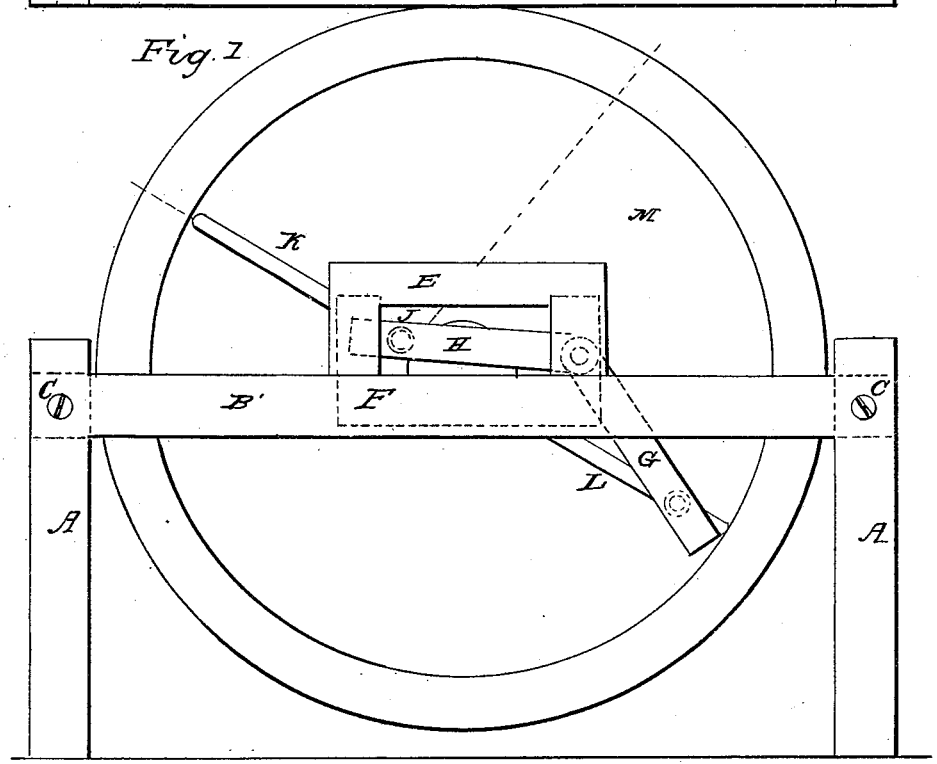

UNITED STATES PATENT OFFICE.

HENRY PECKHAM, OF KINGS FERRY, NEW YORK.

STRAW-CUTTER.

Specification of Letters Patent No. 13,137, dated June 26, 1855.

*To all whom it may concern:*

Be it known that I, HENRY PECKHAM, of Kings Ferry, in the county of Cayuga and State of New York, have invented a new and useful Machine for Cutting Straw and other Articles; and I do hereby declare that the same is described and represented in the following specification and drawings.

To enable others skilled in the art to make and use my invention I will proceed to describe its construction and operation referring to the drawings in which the same letters indicate like parts in each of the figures.

Figure 1, is an elevation and Fig. 2, a plan of such a part of a machine for cutting straw as I deem necessary to show my improvements.

The nature of my invention consists in hanging one or more knives on a pivot arranged so as to be operated by the slot or slots in a revolving disk, wheel or arms to carry the knife or knives around the pivot on which they are hung.

In the above mentioned drawings A, A, are the posts of a frame connected together by the bars B, B', and the girder C, C, so as to form a rectangular frame, the girders C C being connected together by the bar D. The frame E, is fastened to the bar B', and a face plate F, represented by dotted lines in Fig. 1, is fastened or screwed to the inside of the bar B', and frame E, for the knives G, and H, to cut against, which knives are hung upon the screw or pivot I, so as to be swung or carried around it by means of the pivots J, J, fastened in the opposite ends of the knives, which pivots are arranged to traverse in the slots K, and L, in the rotating disk M, which is fastened to the shaft N, which shaft turns in the boxes O, O, fastened to the bars B, and D, as represented. The shaft N, may be turned by a pulley, gear or crank fastened to it for that purpose, so as to carry the disk M, and operate the knives by carrying them around the pivot I.

The shank of the knife G that is fitted to the pivot I, is straight and the shank of the knife H, is set off as represented in Fig. 2, so as to fit onto the pivot I, outside of the other; so as to bring the edges of both knives into the same plane and parallel with the face of the plate F which supports the straw or other material while it is being cut.

A portion of the disk M is represented as being cut out above the slot K, in Fig. 2, so as to show the side of the slots and the end of the pivot J more clearly. When this machine is to be used for cutting straw a box or trough may be arranged opposite to the opening in the frame E and provided with some convenient feeding apparatus to supply the straw to the knives. Although I have described but two knives it will be apparent that by making more slots in the disk more knives may be added.

The machine having been constructed and completed as above described and the straw supplied as above mentioned and the disk turned to operate the knives as they pass the opening under the frame E they sever such portions of the straw as project beyond the face of the plate F and it falls down out of the way; and as the knife approaches the edge of the plate the pivot is traversing in that position of the slot nearest to the center of the disk, so that it is operated with the greatest force in proportion to the power applied to the disk so that this machine will perform more work with a given quantity of power than any machine heretofore made. The knives being carried around the pivot they escape the friction to which vibrating knives are subjected which are carried back across the ends of the straw, and the action of the disk on the pivots tends to press the knives against the face plate F.

Although I have described my machine for cutting straw I contemplate that it can be used to great advantage to cut shingles, staves, laths and other articles.

The advantages of my machine may be enumerated as follows, viz: It will do more work with a given quantity of power. The knives are operated with greater force in proportion to the power applied when they have the most service to perform. The knives are carried around with less power than they could be carried back by the ends of the straw.

I believe that I have described the construction, operation and use of my invention so as to enable any person skilled in the art to make and use the same. I will now specify what I claim, viz:

I claim one or more knives hung on a pivot in combination with a revolving disk or its equivalent carrying one or more slots so as to operate the knife or knives substantially as described for the purposes set forth.

HENRY PECKHAM.

Witnesses:
I. H. MORSELL,
J. DENNIS, Jr.